(12) United States Patent
On Au et al.

(10) Patent No.: US 6,618,720 B1
(45) Date of Patent: Sep. 9, 2003

(54) COMMON SPOOL FILES FOR MAINTAINING JOIN INDEXES

(75) Inventors: Grace Kwan On Au, Rancho Palos Verdes, CA (US); Chi Kim Hoang, Palo Alto, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/594,299

(22) Filed: Jun. 15, 2000

(51) Int. Cl.[7] ............................................. G06F 17/30
(52) U.S. Cl. .................. 707/2; 707/3; 707/5; 709/100
(58) Field of Search ............................. 707/1, 7, 3, 4, 707/200, 101, 2, 10, 100, 104.1, 5, 203; 709/100

(56) References Cited

U.S. PATENT DOCUMENTS

| | | | | |
|---|---|---|---|---|
| 5,241,648 A | | 8/1993 | Cheng et al. .................. 707/7 |
| 5,666,525 A | | 9/1997 | Ross .............................. 707/2 |
| 5,758,146 A | * | 5/1998 | Schiefer et al. ................ 707/2 |
| 5,870,747 A | | 2/1999 | Sundaresan .................. 707/101 |
| 5,983,215 A | | 11/1999 | Ross et al. ...................... 707/2 |
| 5,987,453 A | | 11/1999 | Krishna et al. ................. 707/4 |
| 6,374,236 B1 | * | 4/2002 | Chen et al. ..................... 707/2 |

OTHER PUBLICATIONS

A. Witkowski et al. "NCR 3700—The Next-Generation Industrial Database Computer," Proceeding of the 19th VLDB Conference, Dublin, Ireland, 1993, 14 pgs.

* cited by examiner

Primary Examiner—Dov Popovici
Assistant Examiner—Hassan Mahmoudi
(74) Attorney, Agent, or Firm—Gates & Cooper

(57) ABSTRACT

The retrieval of data from a database in a computerized database management system is optimized through the use of a plurality of join indexed. The join indexes are defined for a table stored in the database. The join indexes are updated to reflect any updated records stored in the table, wherein one or more common joins are identified among the join indexes, each of the common joins are materialized only once in a common spool file, and the common spool file is used to materialize one or more rows for updating the join indexes.

11 Claims, 6 Drawing Sheets

FIG. 2

200 (CUSTOMER_TABLE)

| CUSTKEY | NAME | ADDRESS | STATE |
|---|---|---|---|
| 100 | LOUIS | SAN DIEGO | CA |
| 101 | CHI | PALO ALTO | CA |
| 102 | RICK | EL SEGUNDO | CA |

202 (ORDER_TABLE)

| ORDERKEY | ORDER STATUS | ORDER DATE | PRICE | CUSTKEY |
|---|---|---|---|---|
| 5000 | PENDING | 1/1/2000 | $100 | 102 |
| 5001 | PENDING | 2/1/2000 | $200 | 100 |
| 5002 | PENDING | 3/1/2000 | $300 | 102 |

204 (JOIN_INDEX)

| CUSTKEY | NAME | ORDER STATUS | ORDER DATE | ROW IDS |
|---|---|---|---|---|
| 102 | RICK | PENDING | 1/1/2000 | R3/R1 |
| 100 | LOUIS | PENDING | 2/1/2000 | R1/R2 |
| 102 | RICK | PENDING | 3/1/2000 | R3/R3 |

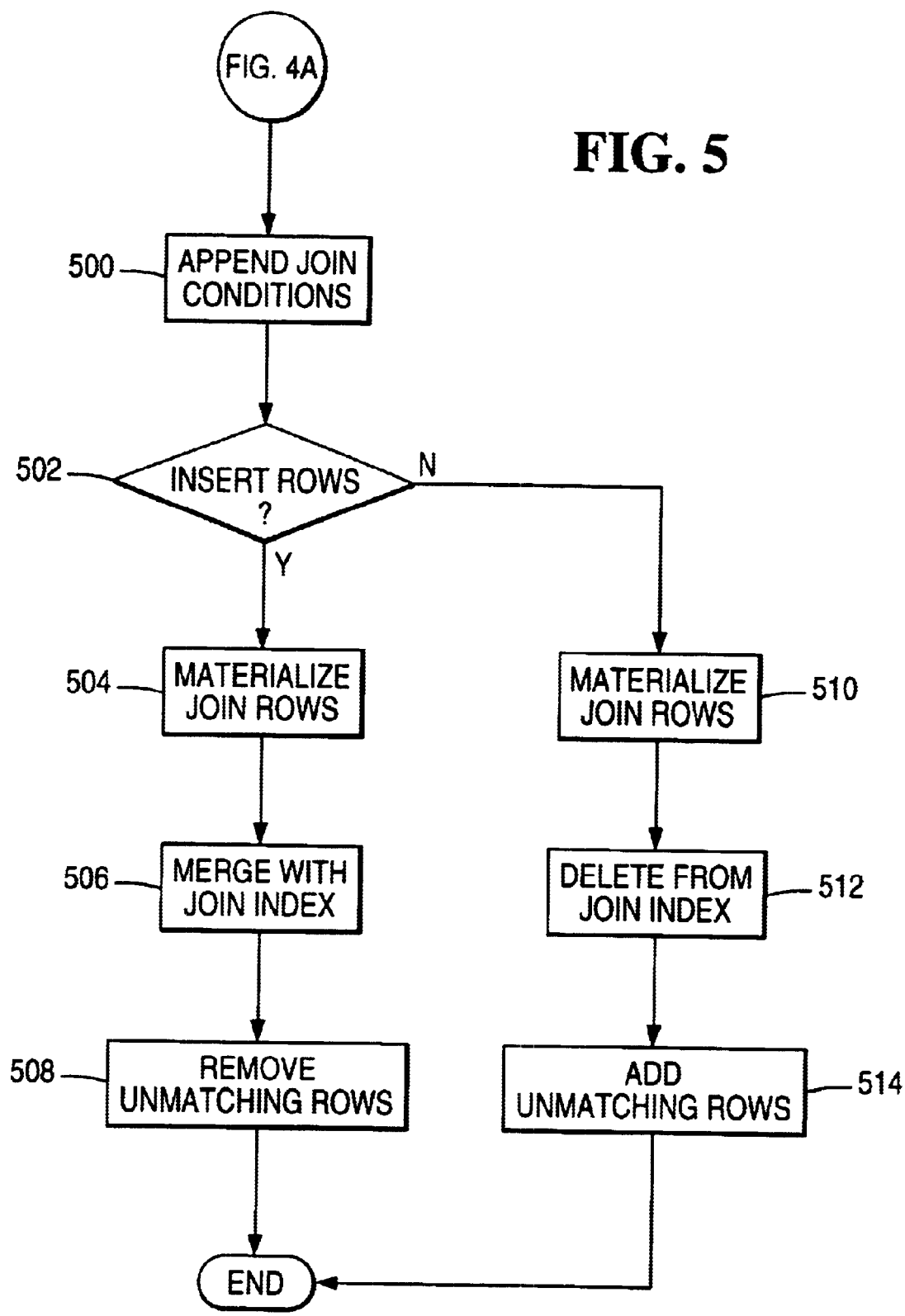

COMMON SPOOL FILES FOR MAINTAINING JOIN INDEXES

CROSS REFERENCE TO RELATED APPLICATIONS

This application is related to the following co-pending and commonly assigned patent applications, all of which are incorporated by reference herein:

Application Ser. No. 09/073,113, entitled "A JOIN INDEX FOR RELATIONAL DATABASES", filed on May 5, 1998, by Chi Kim Hoang, now U.S. Pat. No. 6,167,399, issued on Dec. 26, 2002.

Application Ser. No. 09/594,963, entitled "VIRTUAL JOIN INDEX FOR RELATIONAL DATABASES", filed on Jun. 15, 2002, by Ahmad Ghazal, Paul Sinclair, and Chi Kim Hoang, and Application Ser. No. 09/594,964, entitled "AGGREGATE JOIN INDEX FOR RELATIONAL DATABASES", filed on Jun. 15, 2000, by Grace K. Au and Chi Kim Hoang.

BACKGROUND OF THE INVENTION

1. Field of the Invention

This invention relates in general to computerized relational databases, and in particular, to the use of common spool files for the maintenance of join indexes.

2. Description of Related Art

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO).

In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies in its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT<clause>FROM<clause>WHERE<clause>GROUP BY<clause>HAVING<clause>ORDER BY<clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

Join indexes have been used to improve the performance of join operations in an RDBMS. A description of join indexes, including a novel join index, can be found in co-pending and commonly-assigned application Ser. No. 09/073,113, filed on May 5, 1998, by Chi Kim Hoang, entitled "A JOIN INDEX FOR RELATIONAL DATABASES", which application is incorporated by reference herein.

Join indexes are automatically maintained by the RDBMS when updates are performed on the underlying tables. Usually, additional steps are included in the execution plans for these updates to regenerate the affected portions of the join indexes. In many cases, the queries that define the join indexes have to be re-processed in order to update the join indexes.

When there are a large number of join indexes defined on a table, the overhead of maintaining the join indexes can be quite high. Thus, there is a need in the art for techniques that minimize the overhead involved in performing maintenance on join indexes.

SUMMARY OF THE INVENTION

To overcome the limitations in the prior art described above, and to overcome other limitations that will become apparent upon reading and understanding the present specification, the present invention discloses a method, apparatus, article of manufacture, and data structure related to the maintenance of a plurality of join indexes. The join indexes are defined for a table stored in the database. As the table is updated, queries that define the join indexes are re-processed to obtain the records for updating the join indexes, wherein one or more common joins are identified among the join indexes, each common join is materialized only once in a common spool file, and the common spool file is used to materialize one or more rows for updating the join indexes.

BRIEF DESCRIPTION OF THE DRAWINGS

Referring now to the drawings in which like reference numbers represent corresponding parts throughout:

FIG. 2 illustrates the structure of two base tables and join index according to the preferred embodiment of the present invention;

FIG. 5 is a flowchart illustrating the steps performed by the RDBMS in using the common spool files generated in FIG. 4 to update join indexes.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes join indexes, which provide dramatic performance improvements to queries that involve join operations. The key concept introduced by the present invention is that, by discovering common joins among the join indexes that need to be updated, and by materializing these common joins only once in common spool files, the amount of overhead incurred during the maintenance of join indexes can be minimized.

Environment

Figure 1:
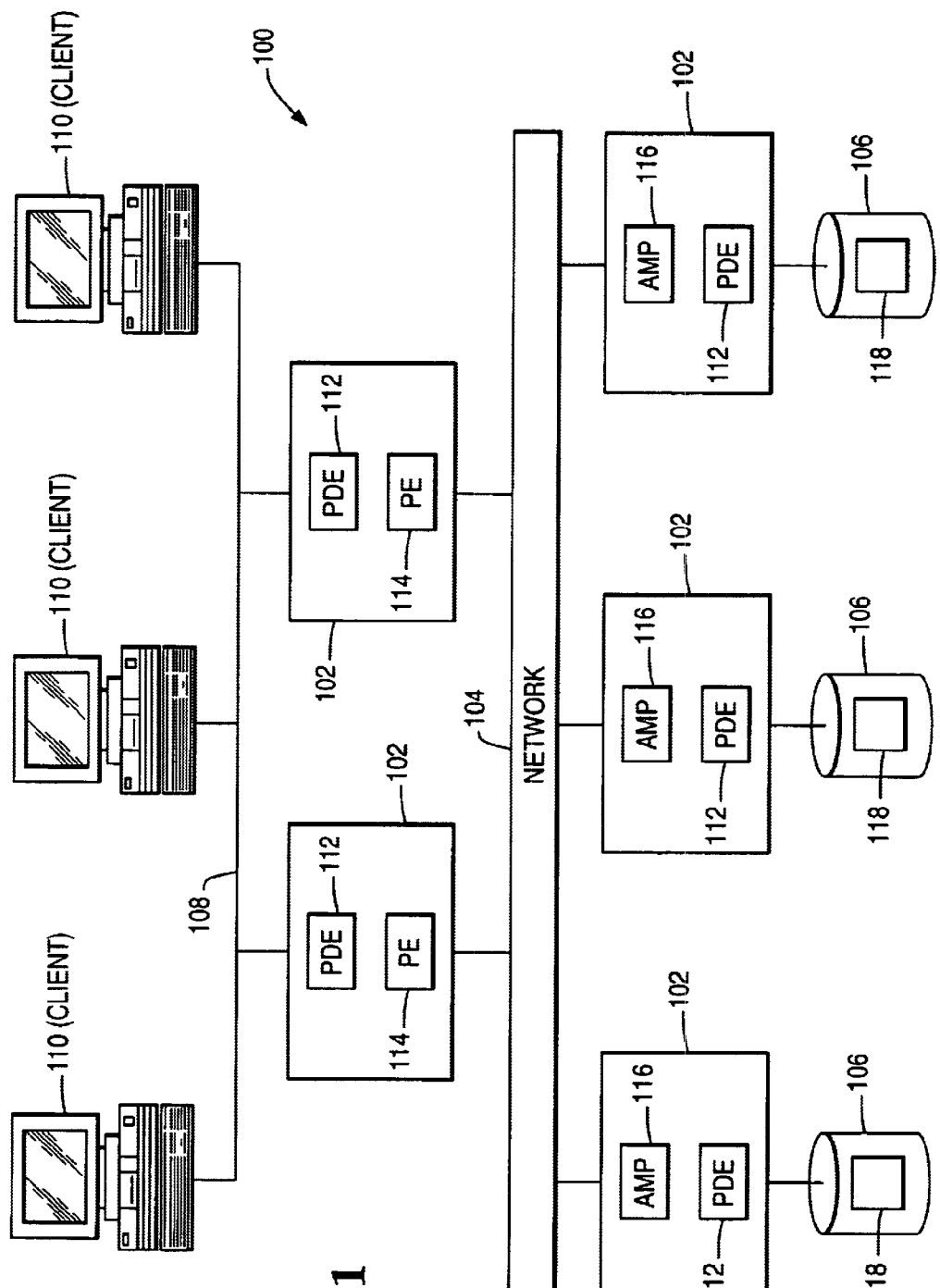
FIG. 1 illustrates an exemplary hardware and software environment according to the preferred embodiment of the present invention.

FIG. 1 illustrates an exemplary hardware and software environment that could be used with the preferred embodiment of the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by a Relational DataBase Management System (RDBMS) executed by the system 100.

In the preferred embodiment of the present invention, the RDBMS comprises the Teradata® product offered by NCR Corporation, and includes one or more Parallel Database Extensions (PDEs) 112, Parsing Engines (PEs) 114, and Access Module Processors (AMPs) 116. These components of the RDBMS perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In the preferred embodiment, data partitioning and repartitioning may be performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Join Index

A join index stores the results from one or more join operations on one or more columns of one or more tables, wherein the join index combines one or more commonly-used columns of the tables. The join index can then be used to satisfy a subsequent query, rather than having to perform the join operations on columns of the tables referenced in the query.

FIG. 2 illustrates the structures of two base tables (CUSTOMER_TABLE 200 and ORDER_TABLE 202), and a join index (JOIN_INDEX 204).

The base tables 200 and 202 are created using the following SQL statements:
   CREATE TABLE CUSTOMER_TABLE(
      CUSTKEY INTEGER NOT NULL,
      NAME CHAR(26) CASESPECIFIC NOT NULL,
      ADDRESS VARCHAR(41),
      STATE VARCHAR(2))
   UNIQUE PRIMARY INDEX(CUSTKEY);
   CREATE TABLE ORDER_TABLE(
      ORDERKEY INTEGER NOT NULL,
      ORDERSTATUS CHAR(1) CASESPECIFIC,
      ORDERDATE DATE FORMAT 'YYYY-MM-DD' NOT NULL,
      PRICE DECIMAL(13,2) NOT NULL,
      CUSTKEY INTEGER)
   UNIQUE PRIMARY INDEX(ORDERKEY);

A simple query comprising a SELECT statement can be defined on the base tables 200 and 202, wherein the query performs a join operation:
   SELECT NAME, ORDERDATE
   FROM ORDER_TABLE, CUSTOMER_TABLE
   WHERE ORDER_TABLE.CUSTKEY=CUSTOMER_TABLE.CUSTKEY
      AND ORDERDATE>DATE '01-01-2000'
      AND ORDERDATE<DATE '03-01-2000';

Without a join index 204, a typical execution plan for this query would involve redistributing ORDER_TABLE 202 into a spool file, sorting the spool file on CUSTKEY, and then performing a merge join between the spool file and the CUSTOMER_TABLE 200.

In the preferred embodiment, however, a join index 204 can be defined as follows:
   CREATE JOIN INDEX JOIN_INDEX
      SELECT   ORDER_TABLE.CUSTKEY,
         CUSTOMER_TABLE.NAME,
         ORDER_TABLE.ORDERSTATUS,
         ORDER_TABLE.ORDERDATE
      FROM ORDER_TABLE, CUSTOMER_TABLE
      WHERE ORDER_TABLE.CUSTKEY=
         CUSTOMER_TABLE.CUSTKEY;

The join index 204 is maintained as a separate table. Each entry in the join index 204 includes the specified column values, as well as row identifiers (or other pointers) to the rows in the tables 200 and 202 with those same column values. Thereafter, queries can scan the join index 204, when at least a portion of the query can be satisfied by the join index 204.

For example, an execution plan for the above SELECT statement may scan the join index 204, in a manner similar to that shown in the following statement:
   SELECT NAME, ORDERDATE
   FROM JOIN_INDEX
   WHERE ORDERDATE>DATE '01-01-2000' AND
      ORDERDATE<DATE '03-01-2000';

The ability to access the join index 204 rather than the tables 200 and 202 provides performance benefits. However, maintenance can be costly. That is, the benefits of the join index 204 are at least partially offset by the overhead of maintaining the data of the join index 204.

Preferably, the join index 204 is automatically maintained by the RDBMS when updates (UPDATE, DELETE, INSERT) are performed on the underlying tables 200 and 202. In the preferred embodiment, additional steps are included in the execution plans for these updates to regenerate the affected portions of the join index 204.

In many cases, the query that defines the join index 204 has to be re-processed in order to update the join index 204. When there are a large number of join indexes 204 defined on a table 200 or 202, the overhead of maintaining the join indexes 204 can be quite high. The present invention uses common spool files to minimize the overhead of maintenance.

Common Spool Files

In the preferred embodiment, common joins are identified among a plurality of join indexes, the common joins are materialized only once in reusable common spool files, and the common spool files are used to materialize join rows for updating the join indexes. The use of common spool files minimizes the amount of overhead incurred during the maintenance of join indexes.

The preferred embodiment of the present invention involves a number of steps. First, information about the join indexes, including join conditions, is collected. After the information has been collected, the join conditions of each join index are analyzed to factor out the "smallest" common join, i.e., the join index that involves the smallest number of tables that are joined by a set of conditions that is a subset of the join conditions that define one or more other join indexes. The smallest common join is materialized into a common spool file. This common spool file is used to replace the base tables of those join indexes that can use the common join. This process is repeated until no more common joins can be found, e.g., iteratively analyzing the remaining join conditions of each join index to factor out the next "smallest" common join that involve the smallest number of tables and the smallest set of join conditions, materializing the next smallest common join into another common spool file, and using this common spool file to replace the base tables of the remaining join indexes. The rows for each join index are materialized from the common spool files and then used to update the join indexes.

Logic of the Relational Database Management System

Flowcharts which illustrate the logic of the RDBMS in creating and using common spool files to maintain join indexes according to the present invention are shown in FIGS. 3, 4A, 4B, and 5. Those skilled in the art will recognize that this logic is provided for illustrative purposes only and that different logic may be used to accomplish the same results.

Information Collection

Figure 3:
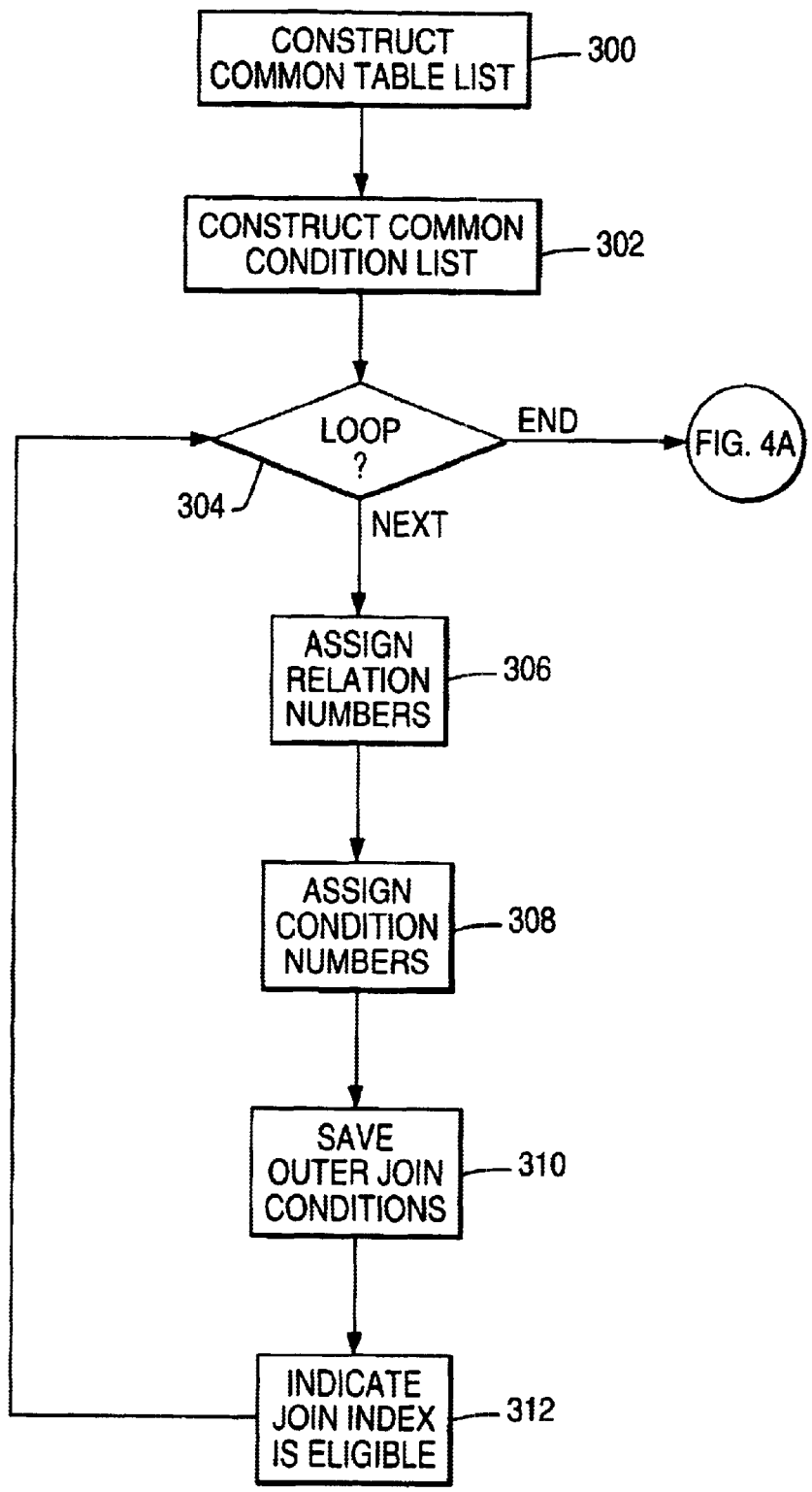
FIG. 3 is a flowchart illustrating the steps performed by the RDBMS in collecting information to facilitate the process of finding common joins.

FIG. 3 is a flowchart illustrating the steps performed by the RDBMS in collecting information to facilitate the process of finding common joins.

Block 300 represents the RDBMS constructing a common table list that contains all the base tables from all the join indexes. In this Block, each unique base table is stored only once and assigned a relation number that is equal to its position in the list.

Block 302 represents the RDBMS constructing a common condition list that contains all the conditions from all the join indexes. Each unique condition is stored only once and assigned a condition number that is equal to its position in the list.

Block 304 is a decision block that represents the RDBMS looping through each join index. For each iteration, control transfers to Block 306; upon completion, control transfers to FIG. 4A.

Block 306 represents the RDBMS assigning the set of relation numbers from the common table list that comprise the base tables for this join index.

Block 308 represents the RDBMS assigning the set of condition numbers from the common conditions list that comprise the conditions for this join index.

Block 310 represents the RDBMS saving outer join conditions in the common condition list. In addition, this Block links together outer join terms of this join index in a list and a pointer to this list is saved in a data structure associated with the join index.

Block 312 represents the RDBMS initializing the join index to indicate that it is eligible for common join processing.

Thereafter, control returns to Block 304.

Common Join Identification and Construction

Figure 4A:
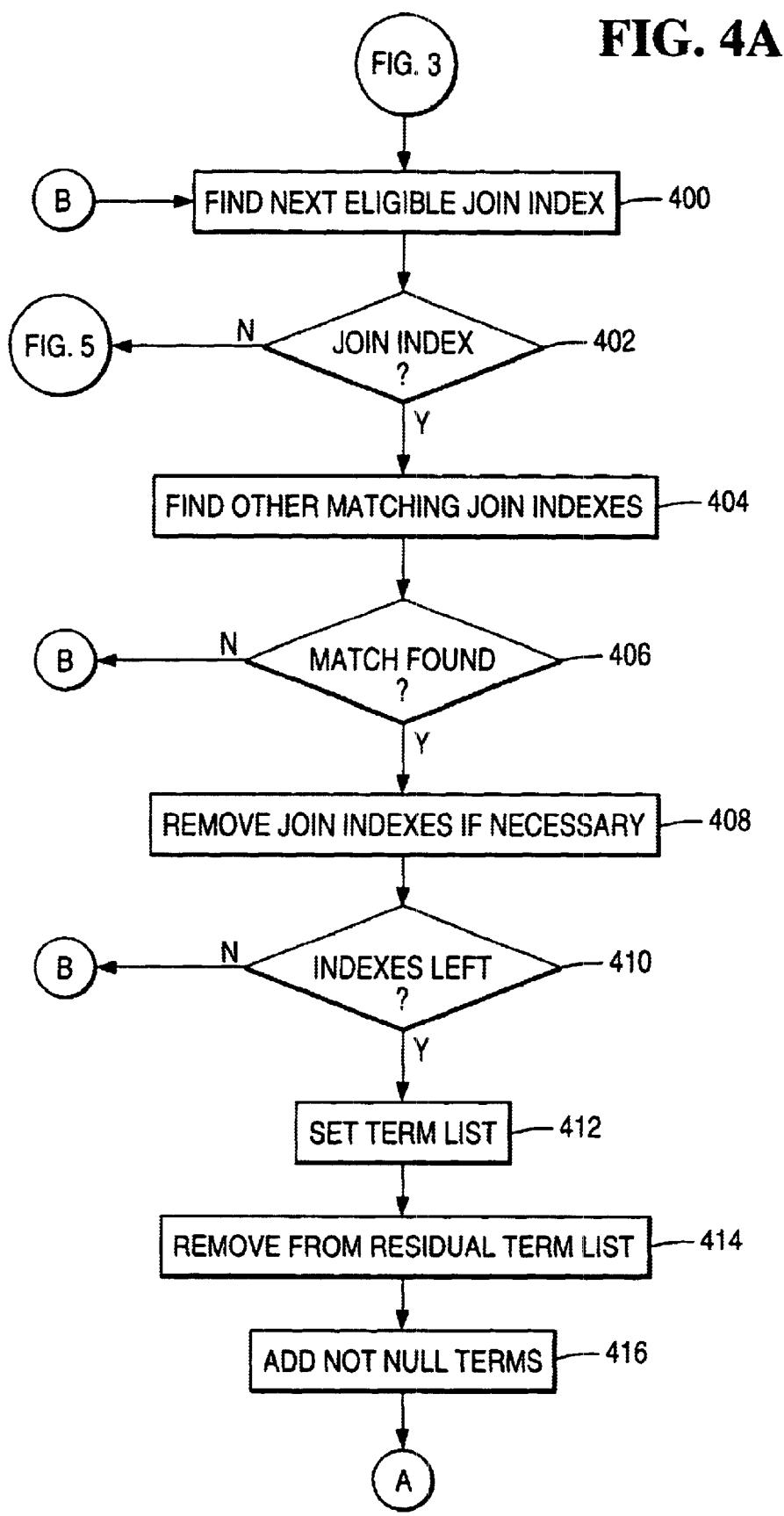
FIGS. 4A and 4B together are a flowchart illustrating the steps performed by the RDBMS in identifying and constructing common joins using the information collected in FIG. 3.
Figure 4B:
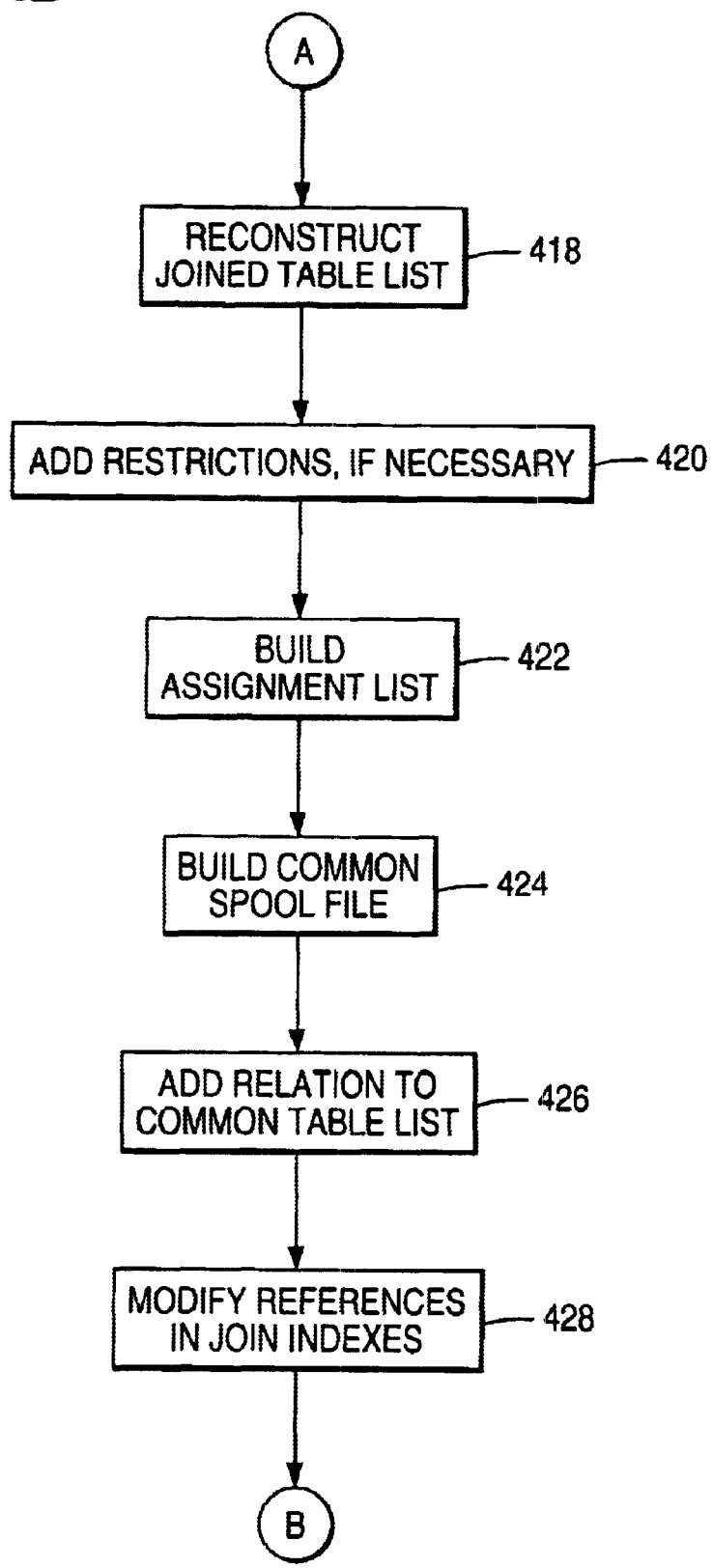

FIGS. 4A and 4B together are a flowchart illustrating the steps performed by the RDBMS in identifying and constructing common joins using the information collected in FIG. 3.

Referring to FIG. 4A, Block 400 represents the RDBMS finding the next eligible join index that has the least number of relations. If multiple join indexes having the same least number of relations are found, the one with the least number of join conditions is picked. A common join must be a complete join of at least one join index.

Block 402 is a decision block that represents the RDBMS determining whether there is a next eligible join index. If so, control transfers to Block 404; otherwise, no more eligible join indexes can be found and control transfers to FIG. 5.

Block 404 represents the RDBMS finding all other join indexes that have at least all the join conditions of the join index found in Block 400 above.

Block 406 is a decision block that represents the RDBMS determining whether any matching join indexes were found. If so, control transfers to Block 408; otherwise, if none were found, this join index is marked as not eligible for common join processing and control returns to Block 400.

Block 408 represents the RDBMS removing, from the set of join indexes found in Block 404 above, any join index where the use of this common join will prevent the join index from sharing a common join with a larger number of tables with another join index. Block 408 also represents the RDBMS removing, from the set of join indexes, any join indexes that have conflicting outer join terms.

Block 410 is a decision block that represents the RDBMS determining whether any join indexes are left. If so, control transfers to Block 412; otherwise, if there are no join indexes that can use this common join, the join index is marked as not eligible for common join processing and control returns to Block 400.

Block 412 represents the RDBMS setting the term list for the common join, wherein the term list is the list of terms from the join index found in Block 400, as well as all the unique outer join terms found from all the join indexes that share the common join.

Block 414 represents the RDBMS removing the term list from the residual term list of all the join indexes that share the common join.

Block 416 represents the RDBMS adding "not null" terms for each join index that is not defined with the outer join term used to build the common join.

Thereafter, control transfers to FIG. 4B via "A".

Referring to FIG. 4B, Block 418 represents the RDBMS reconstructing the joined table list for the common join.

Block 420 represents the RDBMS adding restrictions to the common join, if the common join includes the base table that is being updated and some restrictions on the table are specified in the user's update request.

Block 422 represents the RDBMS building the assignment list of the common join so that it includes fields of the common tables from the select list and from the residual term list. These lists are mapped to refer to fields of the common spool.

Block 424 represents the RDBMS building the common spool file.

Block 426 represents the RDBMS adding the common spool file relation to the common table list.

Block 428 represents the RDBMS modifying the residual term list and the relation set of each join index that can use the common join to refer to the common spool file relation.

Thereafter, control transfers to FIG. 4A via "B".

Using Common Spool Files to Update Join Indexes

FIG. 5 is a flowchart illustrating the steps performed by the RDBMS in using the common spool files resulted from FIGS. 4A and 4B. After all possible common joins have been materialized and joins on base tables of the join indexes have been replaced by joins on these common spool files, if any, execution plans are generated to update each join index as described below.

Block 500 represents the RDBMS appending conditions from the user's update request into the join index's condition, if there exists any that have not been incorporated into the common spool yet.

Block 502 is a decision block that represents the RDBMS determining whether rows are being inserted into the base table. If so, control transfers to Block 504; otherwise, control transfers to Block 510.

Block 504 represents the RDBMS materializing rows for inserting into the join index using any common spool files identified for this join index in FIGS. 4A and 4B. If the join index is defined by a common join, the join index has already been materialized in a common spool and no additional processing is needed here to materialize the join index.

Block 506 represents the RDBMS performing a merge step to insert the join rows into the join index.

Block 508 represents the RDBMS removing non-matched rows from the join index, if the base table is an inner table. Thereafter, the logic terminates.

Block 510 represents the RDBMS materializing rows for deleting from the join index using any common spool files identified for this join index in FIGS. 4A and 4B. If the join index is defined by a common join, the join index has already been materialized in a common spool and no additional processing is needed here to materialize the join index.

Block 512 represents the RDBMS deleting the join rows from the join index.

Block 514 represents the RDBMS adding non-matched rows to the join index, if the deleted table is an inner table of the join index. Thereafter, the logic terminates.

CONCLUSION

This concludes the description of the preferred embodiment of the invention. The following paragraph describes an alternative embodiment for accomplishing the same invention.

In one alternative embodiment, any type of computer, such as a mainframe, minicomputer, or personal computer, could be used to implement the present invention. In addition, any database management system (DBMS) that performs join operations or uses join indexes could benefit from the present invention.

In summary, the present invention discloses a method, apparatus, article of manufacture, and data structure related to the maintenance of a plurality of join indexes. The join indexes are defined for a table stored in the database. The join indexes are updated to reflect any updated records stored in the table, wherein one or more common joins are identified among the join indexes, each of the common joins are materialized only once in a common spool file, and the common spool file is used to materialize one or more rows for updating the join indexes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing retrieval of data from a database in a computerized database management system, comprising:
   (a) updating one or more records stored in a table in the database; and
   (b) updating a plurality of join indexes defined for the table to reflect the updated records stored in the table, wherein one or more common joins are identified among the join indexes, each of the common joins are materialized only once in a common spool file, and the common spool file is used to materialize one or more rows for updating the join indexes.

2. The method of claim 1, wherein the updating step comprises:
   (1) collecting information about join conditions for the join indexes;
   (2) analyzing the join conditions to identify the common joins;
   (3) materializing the common joins in the common spool file; and
   (4) updating the join indexes using the rows materialized from the common spool file.

3. The method of claim 2, further comprising repeating steps (1)–(4) for a next smallest common join.

4. A computerized database management system for optimizing retrieval of data from a database, comprising:
   (a) logic, performed by the database management system, for:
      (1) updating one or more records stored in a table in the database; and
      (2) updating a plurality of join indexes defined for the table to reflect the updated records stored in the table, wherein one or more common joins are identified among the join indexes, each of the common joins are materialized only once in a common spool file, and the common spool file is used to materialize one or more rows for updating the join indexes.

5. The system of claim 4, wherein the logic for updating comprises logic for:
   (i) collecting information about join conditions for the join indexes;
   (ii) Analyzing the join conditions to identify the common joins;
   (iii) materializing the common joins in the common spool file; and
   (iv) updating the join indexes using the rows materialized from the common spool file.

6. The system of claim 5, further comprising logic for repeating the logic (i)–(iv) for a next smallest common join.

7. An article of manufacture embodying logic for performing a method of optimizing retrieval of data from a database in a computerized database management system, the method comprising:
   (a) updating one or more records stored in a table in the database; and
   (b) updating a plurality of join indexes defined for the table to reflect the updated records stored in the table, wherein one or more common joins are identified among the join indexes, each of the common joins are materialized only once in a common spool file, and the common spool file is used to materialize one or more rows for updating the join indexes.

8. The article of manufacture of claim 7, wherein the updating step comprises:
   (1) collecting information about join conditions for the join indexes;
   (2) analyzing the join conditions to identify the common joins;
   (3) materializing the common joins in the common spool file; and
   (4) updating the join indexes using the rows materialized from the common spool file.

9. The article of manufacture of claim 8, further comprising repeating steps (1)–(4) for a next largest common join.

10. A data structure stored in a memory for use by a database management system executed by a computer, the data structure comprising a common spool file used to maintain a plurality of join indexes defined on at least one table stored in the database, wherein the plurality of join indexes are updated to reflect updated records stored in the table, by identifying one or more common joins among the join indexes, by materializing each of the common joins only once in the common spool file, and by using the common spool file to materialize one or more rows for updating the join indexes.

11. The data structure of claim 10, wherein information is collected about join conditions for the join indexes, the join conditions are analyzed to identify the common joins, the common joins are materialized in the common spool file, and the join indexes are updated using the rows materialized from the common spool file.

* * * * *

UNITED STATES PATENT AND TRADEMARK OFFICE
CERTIFICATE OF CORRECTION

PATENT NO.    : 6,618,720 B1
DATED         : September 9, 2003
INVENTOR(S)   : Au, G. K. and Hoang, C. K.

It is certified that error appears in the above-identified patent and that said Letters Patent is hereby corrected as shown below:

Title page,
Item [*] Notice, delete "Subject to any disclaimer, the term of this patent is extended or adjusted under 35 U.S.C. 154(b) by 0 days." and insert -- Subject to any disclaimer, the term of this patent is extended or adjusted under 35 U.S.C. 154(b) by 308 days. --

Signed and Sealed this

Eleventh Day of January, 2005

JON W. DUDAS
*Director of the United States Patent and Trademark Office*